US008325944B1

(12) United States Patent
Duwenhorst et al.

(10) Patent No.: US 8,325,944 B1
(45) Date of Patent: Dec. 4, 2012

(54) AUDIO MIXES FOR LISTENING ENVIRONMENTS

(75) Inventors: Sven Duwenhorst, Hamburg (DE); Holger Classen, Hamburg (DE); James A. Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 1044 days.

(21) Appl. No.: 12/267,339

(22) Filed: Nov. 7, 2008

(51) Int. Cl.
*H04B 1/00* (2006.01)

(52) U.S. Cl. .......................................... 381/119; 700/94

(58) Field of Classification Search .................. 381/119; 700/94
See application file for complete search history.

(56) References Cited

U.S. PATENT DOCUMENTS 4,340,780 A 7/1982 Odlen
5,434,922 A 7/1995 Miller et al.
7,158,643 B2 1/2007 Lavoie et al.
7,181,297 B1 2/2007 Pluvinage et al.
2005/0129252 A1 6/2005 Heintzman et al.

OTHER PUBLICATIONS

"Creating the Perfect Stereo Mix," excerpt from Samplecraze's new ebook release, Mixing Simplified, vol. 1: Creating the Perfect Stereo Mix, by Eddie Bazil, Samplecraze Sound Font Development.
Bharitkar, Sunil, An Alternative Design for Multichannel and Multiple Listener Room Acoustic Equalization, Abstract, IEEE, © 2004 IEEE.

*Primary Examiner* — Douglas Menz
(74) *Attorney, Agent, or Firm* — Fish & Richardson P.C.

(57) ABSTRACT

This specification describes technologies relating to generating audio mixes for listening environments. A method is provided that includes receiving digital audio data; receiving an environmental input, the environmental input being associated with the listening environment; calculating one or more audio parameters for the digital audio data based on the received environmental input, the calculating including: calculating a particular intensity level for the digital audio data, and processing the digital audio data according to specified reference levels; and generating an audio mix for the digital audio data according to the calculated audio parameters.

24 Claims, 6 Drawing Sheets

AUDIO MIXES FOR LISTENING ENVIRONMENTS

BACKGROUND

The present disclosure relates to editing audio signals.

Audio signals including audio data can be provided by a multitude of audio sources. Examples include audio signals from an FM radio receiver, a compact disc drive playing an audio CD, a microphone, or audio circuitry of a personal computer (e.g., during playback of an audio file). With the advent of the home theater system, home movies provide options for the user to enjoy a movie with similar qualities to a movie theater. A typical DVD released in the United States has several sound options, for example, English 5.1 Digital Surround, English Surround 2.0, Spanish 2.0, and audio commentary tracks. The process of modifying the properties of multiple audio signals including audio data in relation to each other, in relation to other audio signals, or combining audio signals is referred to as mixing. A sound engineer mixes each of these tracks for particular levels in an audio spectrum based on a typical human hearing range, and the home theater is set up to mirror those expected levels.

Portable electronic devices, e.g., cell phones, laptops, portable DVD players, and iPods, can be used in various environments. For example, people can watch movies or listen to music in their cars, on airplanes, and outdoors. These different environments can impact the quality of an audio signal, adding background noise to the listener's experience. For example, a high-pitch whine generated by an airplane engine can make dialogue difficult to hear for a typical listener. Similarly, the sounds of a moving car create a barrier in enjoying an individual's favorite song. Likewise, although cinephiles will often have standards to their environment to enjoy a movie to its maximum, a typical movie-watcher may not have or want to allocate the financial resources to an optimal sound system.

SUMMARY

This specification describes technologies relating to generating audio mixes for listening environments.

In general, one aspect of the subject matter described in this specification can be embodied in computer-implemented methods that include the actions of receiving digital audio data; receiving an environmental input, the environmental input being associated with the listening environment; calculating one or more audio parameters for the digital audio data based on the received environmental input, the calculating including: calculating a particular intensity level for the digital audio data, and processing the digital audio data according to specified reference levels; and generating an audio mix for the digital audio data according to the calculated audio parameters. Other embodiments of this aspect include corresponding systems, apparatus, and computer program products.

These and other embodiments can optionally include one or more of the following features. The method further includes transmitting the audio mix. The method further includes storing the audio mix on a computer-readable storage medium. The method further includes capturing ambient audio data using an input device. The method further includes providing sound quality of an output device for further signal processing of the digital audio data from the environmental input. The method further includes receiving a request from a user for the audio mix, the request comprising a matching environmental input and transmitting the audio mix. The method further includes generating an alternative audio mix based on an alternative environmental input.

In general, one aspect of the subject matter described in this specification can be embodied in computer-implemented methods that include the actions of receiving an input associated with a listening environment of a user; using the received input to identify a particular listening environment from among a plurality of listening environments; identifying an audio mix corresponding to the particular listening environment, where the audio mix includes one or more parameters adjusted for the particular listening environment; retrieving the identified audio mix; and generating an audible output from the identified audio mix. Other embodiments of this aspect include corresponding systems, apparatus, and computer program products.

These and other embodiments can optionally include one or more of the following features. The method further includes receiving a user input identifying the particular listening environment from among the plurality of listening environments. The method further includes capturing an ambient audio signal; and analyzing the ambient audio signal to determine the particular listening environment. The method further includes receiving a collection of audio mixes for particular digital audio data where each audio mix corresponds to a distinct listening environment of the plurality of listening environments, where retrieving the identified audio mix includes selecting the identified audio mix from the collection of audio mixes. The method further includes transmitting a request for the identified audio mix; and receiving the requested audio mix. The method further includes changing an amplitude of the audio mix based on the parameters for the particular listening environment. The method further includes listening environments identified based on one or more of the following listening environment parameters: amplitude associated with the listening environment, frequencies associated with the listening environment, and location associated with the listening environment.

In general, one aspect of the subject matter described in this specification can be embodied in computer-implemented methods that include the actions of receiving digital audio data; receiving an input associated with a listening environment; using the received input to identify the listening environment; generating an audio mix for the digital audio data, the generating including modifying one or more parameters of the audio data based on the particular listening environment and where modifying the one or more parameters includes modifying one or more reference levels to specified values for the listening environment; and generating an audible format from the audio mix. Other embodiments of this aspect include corresponding systems, apparatus, and computer program products.

Particular embodiments of the subject matter described in this specification can be implemented to realize one or more of the following advantages. Users can easily select a mix appropriate for their listening environment. Particular mixes provide high quality audio for different listening environments.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
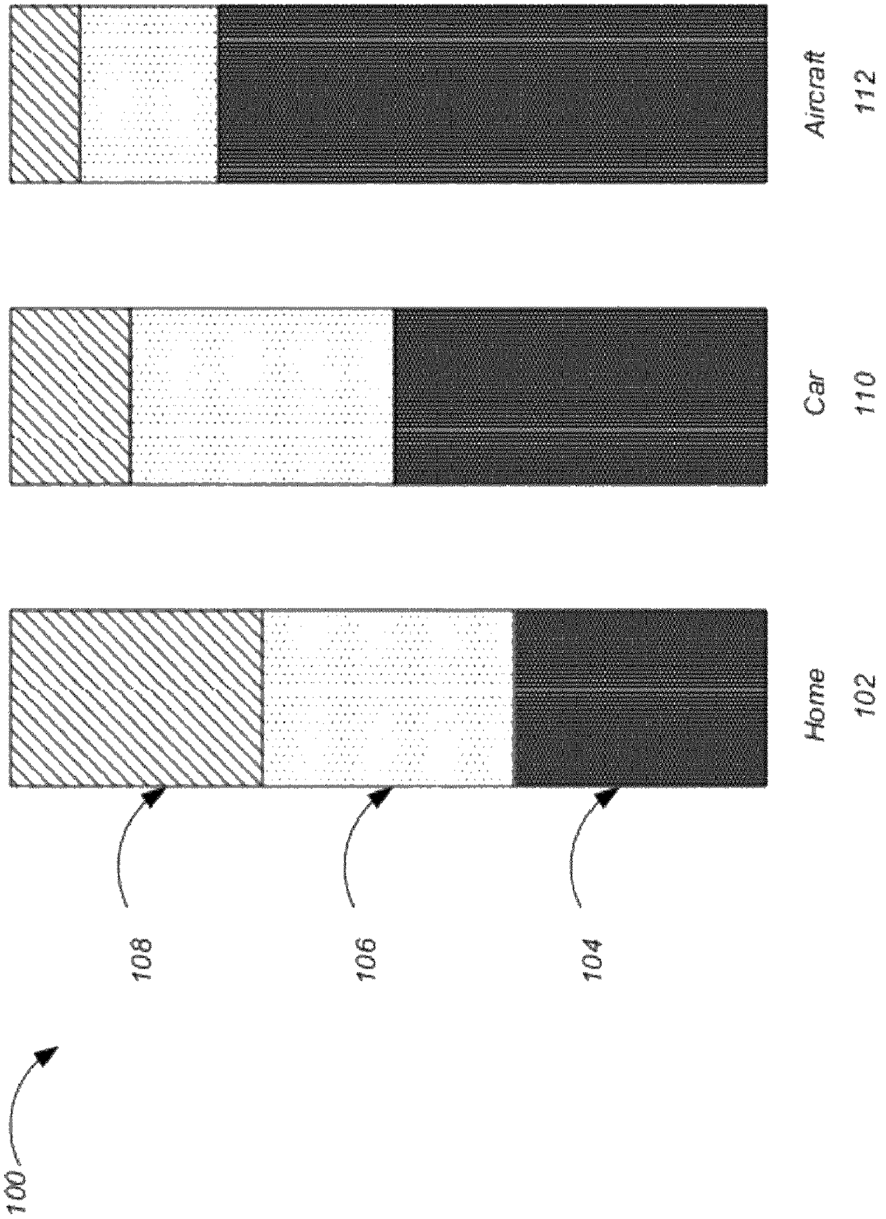
FIG. 1 shows a diagram representing example levels for audio in different environments.

FIG. 1 shows a diagram 100 representing example levels for audio mixes generated for different environments. The diagram 100 includes example audio levels for different environments, e.g., a home environment 102. In particular, the home environment 102 is shown with three levels providing sections within an available audio spectrum: a noise floor 104, a preferred average 106, and headroom 108. The sections, as shown, provide a division such that if one level increases in size, the others diminish to compensate. The noise floor 104 represents the measure of a signal created from the sum of all noise sources and unwanted signals within the audio spectrum. The preferred average 106 can represent, for example, a root-mean-square (RMS) of all the signals within an audio spectrum. RMS is a statistical measure of the magnitude of a varying quantity to create a digital version of an analog signal. Alternatively, the preferred average 106 can represent a mean of an absolute value of the audio spectrum or using peak values of a waveform of the audio spectrum. Averages can be taken over a period of time, (e.g., 25-50 milliseconds, corresponding to the human auditory system). In some implementations, the average is taken over longer periods of time, for example in music where the gain could pump, or bounce up and down, with the beat of the song. The headroom 108 represents an amount by which linear signal capabilities exceed an actual signal level, i.e., the amount that full scale exceeds a permitted maximum level in decibels.

The example levels illustrate three different variables within the audio spectrum. For example, the preferred average 106 shows a signal band in the audio spectrum that can be processed using digital signal processing to enhance particular audio qualities, e.g., clarity and amplitude. In a home environment 102, the hum of a refrigerator can be considered an undesirable sound. A portion of the noise floor 104 can be removed using digital signal processing, e.g., using a band-pass filter to remove a constant whir of a DVD player's motor, or filtering the sound of moving water with a high pass filter. The headroom 108 of the home environment 102 can provide a reserve in the audio spectrum to avoid clipping of higher-voltage transients.

As shown in FIG. 1, the diagram 100 also includes a car environment 110 and an aircraft environment 112. In the example shown, the home environment 102 has equal sample levels of the noise floor 104, the preferred average 106, and the headroom 108. By comparison, the car environment 110 is illustrated with a similarly sized sample level for a preferred average, but has a larger noise floor and a smaller headroom. As depicted in FIG. 1, the reduced headroom occurs naturally because the audio spectrum can only provide for a predetermined range of frequencies and amplitudes of an audio signal once the range of the noise floor has increased. For an individual comparing the sounds of riding in a car versus sitting in a house, the changes to the noise floor for particular environments can be intuitive. In most instances, a car's engine can create more noise at a closer range than the hum of a house's heating system. Similarly, the aircraft environment 112 can have an even greater noise floor, with reduced preferred average and headroom. Again, the reduced headroom and preferred average have decreased ranges because of the increase in the range of the noise floor. An individual having experience riding in a plane can compare the louder engine and air system of a plane as generating more noise than a house or a car.

Figure 2:
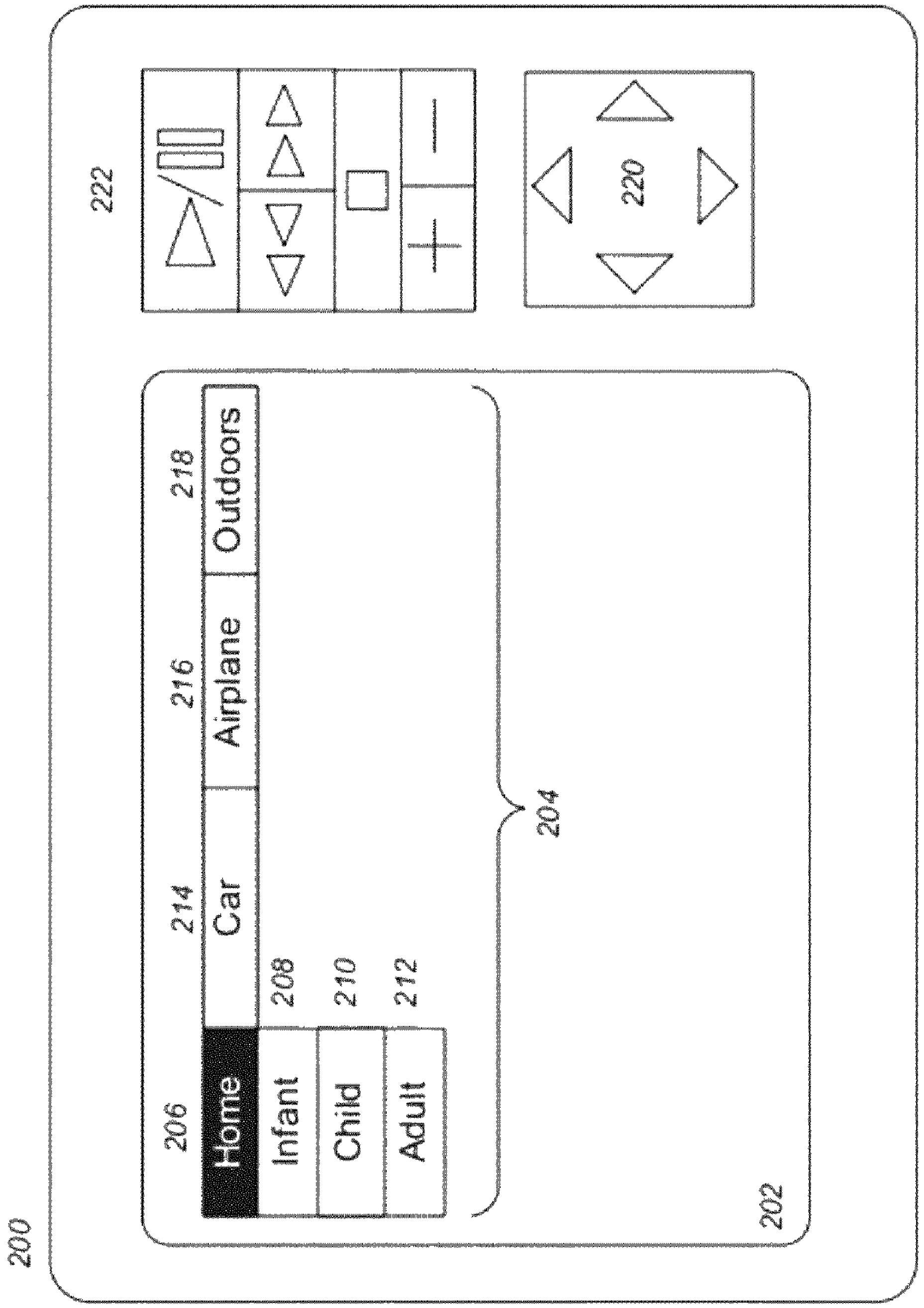
FIG. 2 is an illustration of an example user interface.

FIG. 2 is an illustration of an example user interface 200. The user interface 200 provides for the input of environmental conditions corresponding to different listening environments. The user interface 200 is provided, for example, as part of a system including a media player.

The user interface 200 includes a screen 202 with different listening environment options 204. Each listening environment option 204 represents a different user selectable listening environment. The user can select a particular listening environment to represent their current listening environment. As discussed with FIG. 1, different environments provide different noise signals, e.g., ambient noise. The listening environment option 204 provides data to a system to process a digital audio signal such that a particular digital audio signal will be provided that has been mixed for the selected listening environment.

In some implementations, each listening environment option in a menu of listening environment options includes a submenu of listening environment options. The user interface 200 shows listening environment options 204 for a home environment 206 with the submenu of listening environment options for an infant environment 208, a child environment 210, and an adult environment 212. Likewise, the user interface 200 is shown with listening environment options 204 for a car environment 214, an aircraft environment 216, and an outdoors environment 218. A user can select one of the listening environment options 204 using an arrow control 220. The user can control the user interface 200 with a user control 222 shown having a play/pause button, rewind, fast forward, stop, and volume control buttons. In alternative interfaces, the user can use another input device, e.g., a touch screen, a remote, or a voice command to select one of the environment options 204.

Each listening environment option 204 is associated with one or more environmental parameters for the system to use in processing digital audio data. For example, the infant environment 208 can provide parameters such that an assumed ambient noise is of a lower amplitude than a typical household, while the child environment 210 can provide parameters for a household with louder ambient noise and higher frequencies being more common. In a household with an infant, the adults can make less noise in the household than a household without an infant because the infant can sleep more often than the adults, and the adults can provide a quieter environment conducive to the infant's sleeping. In some implementations, the expected noise floor for the infant environment 208 is lower than for the home environment 206. Alternatively, the child environment 210, however, can compensate for the level of volume of a household with children, e.g., hand-held video games, toys, and the volume and pitch of the child's voice. The adult environment 212 can provide parameters for a household that may be the intended environment for the digital audio data.

In some implementations, the user interface 200 displays a highlighted listening environment option 204. For example, the highlighting can indicate a user selected listening environment. Alternatively, in another example, the highlighting can indicate that the system has estimated a particular listening environment.

In some implementations, the system includes an audio capture device, e.g., a microphone. The microphone can receive ambient noises and allow the system to estimate the listening environment for the device. The system can automatically select the estimated listening environment and highlight the listening environment on the user interface 200. Similarly, if the microphone receives a sound similar to a large engine, the system can determine the environment is the aircraft environment 216 and highlight the aircraft environment 216.

The system can also save the previous setting from the last instance the system was used and set a default listening environment option 204 to the last selected listening environment option 204. The system can highlight this default listening environment to indicate the setting when a new use begins.

Figure 3:
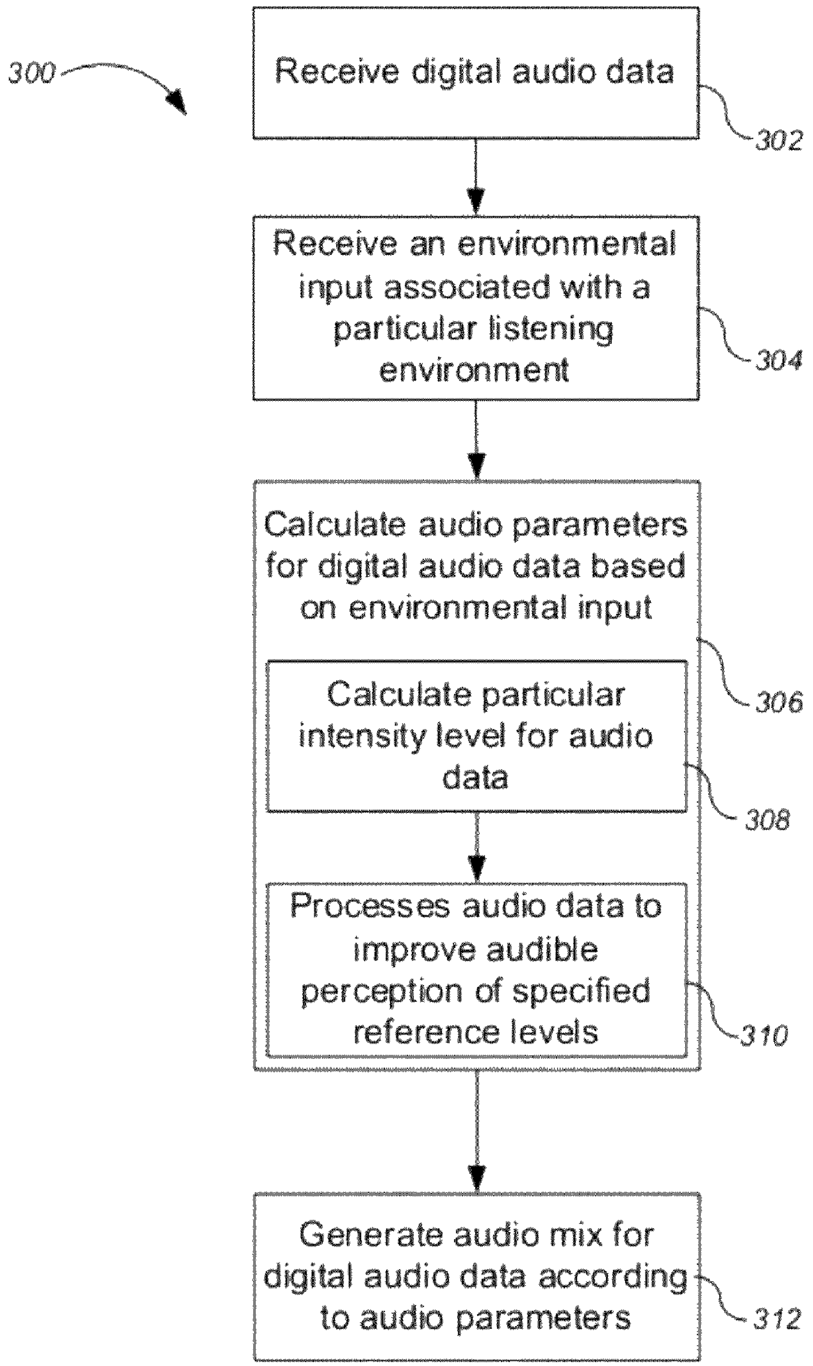
FIG. 3 is a flow chart of an example method for generating audio mixes for particular listening environments.

FIG. 3 is a flow chart of an example method 300 for generating audio mixes for particular listening environments. For convenience, the method 300 will be described with respect to a system that performs the method 300.

The system receives 302 digital audio data. The system can receive the digital audio data, for example, as part of a file (e.g., an audio file or other file including embedded audio including, for example, a WAV, digital video (DV), or other audio or video file). The file can be locally stored or retrieved fro a remote location, including as an audio or video stream. The system can receive digital audio data, for example, in response to a user selection of a particular file (e.g., an audio file having one or more tracks of digital audio data). A track is a distinct section of digital audio data, usually having a finite length and including at least one distinct channel. For example, a track can be digital stereo audio data contained in an audio file, the digital audio data having a specific length (e.g., running time), that is included in an audio mix (e.g., a combination of tracks, mixed audio data) by assigning a specific start time and other mixing parameters.

In some implementations, the digital audio data is retrieved from a file stored at a remote location without transferring the file. For example, the system can retrieve portions of the digital audio data in a streaming format, or only portions of a particular file. Alternatively, the digital audio data can be the soundtrack to a movie with an audio commentary track, and the system can retrieve the soundtrack to the movie without the audio commentary.

The system receives 304 an environmental input. The environmental input is associated with a particular listening environment. The environmental input can include parameter values, e.g. amplitude values or level values. As shown in FIG. 2, various environmental inputs may be input into the system. In some implementations, a user provides an environmental input by selecting a listening environment from a menu of options. Additionally, an environmental input can be stored in the system as the default environmental input. For example, the system can include set-up options for the most likely environment that a user will use the system. Likewise, an input device, e.g. a microphone on a laptop computer or the receiver on a mobile device, can provide data to the system to determine the listening environment. For example, the mobile device receiver can capture ambient noises related to birds and dogs. The system can determine that the listening environment is a park or other outdoor setting.

The system calculates 306 one or more audio parameters for the digital audio data based on the received environmental input. For example, the system can determine parameters based on the example audio levels shown in FIG. 1, in which the noise floor, the headroom, and the preferred average are specified for specific listening environments. In some implementations, the system calculates 308 a particular intensity level for the digital audio data.

In some implementations, the system computes a perceptual average of the digital audio data, or the relative sound to a human perceiving the digital audio data, and a perceptual average of the particular listening environment. A perceptual average can be associated with the human auditory system and can be varied in the level of complexity for processing. In a simple model, perceptual averaging for the digital audio data can be the RMS average of the digital audio data. The system can use the perceptual averages to determine which frequencies to emphasize that correspond with human auditory ranges as compared to the listening environment.

In some implementations, the system processes 310 the digital audio data to improve the audible perception of the specified reference levels. For example, the system can use the sample levels illustrated in FIG. 1 to determine portions of the digital audio data to process. Alternatively, the system can use filtering or other digital signal processing on the environmental input from the input device to determine reference levels. For example, a playback device can receive ambient noise as the environmental input, e.g., through the microphone of the laptop or an portable audio player. The system can use digital signal processing to determine a noise floor or headroom.

In some implementations, the environmental input provides information regarding the sound quality of an output device for further signal processing of the digital audio data. For example, if the laptop microphone receives a signal that is from the laptop speakers or attached speakers, the system can process the received signal to determine various strengths and weaknesses of the speaker system. If the speaker system has limited bass quality, the system can adjust to compensate (e.g., by amplifying low frequency audio data). Likewise, if the speaker system is of poor quality, the system can use a lower quality of digital audio data if the digital audio data is being streamed.

The system generates 312 an audio mix for the digital audio data according to the calculated audio parameters. In particular, the generated audio mix is associated with a particular listening environment. For example, once the digital audio data has been adjusted to meet the parameters of the listening environment, the adjusted digital audio data can be transmitted to the speakers of the laptop. In another implementation, the system transmits the generated audio mix to a user device from a centralize server. Similarly, the system can store the audio mix for later use on a computer-readable storage medium. For example, the audio mix can be stored on a server, a CD, a DVD, a flash drive, a mobile device, a personal computer, or a server.

In some implementations, the system receives a request from a user for an audio mix corresponding to a particular listening environment. For example, a user may request an audio mix by submitting a matching environmental input. The system can then search for an audio mix associated with the environmental input submitted and transmit the corresponding audio mix to a user device.

In other implementations, the system generates an alternative audio mix using an alternative environmental input. For example, the system can generate and store multiple audio mixes based on multiple environmental inputs, e.g., a DVD with multiple audio mixes. Likewise, the system can receive an alternative environmental input while an audio mix is playing and recalculate the parameters for an alternative audio mix. For example, if the system is receiving environmental input from a laptop microphone and detects ambient noise indicating that children have entered the room, the system can adjust the parameters and generate an alternative audio mix for the user.

Figure 4:
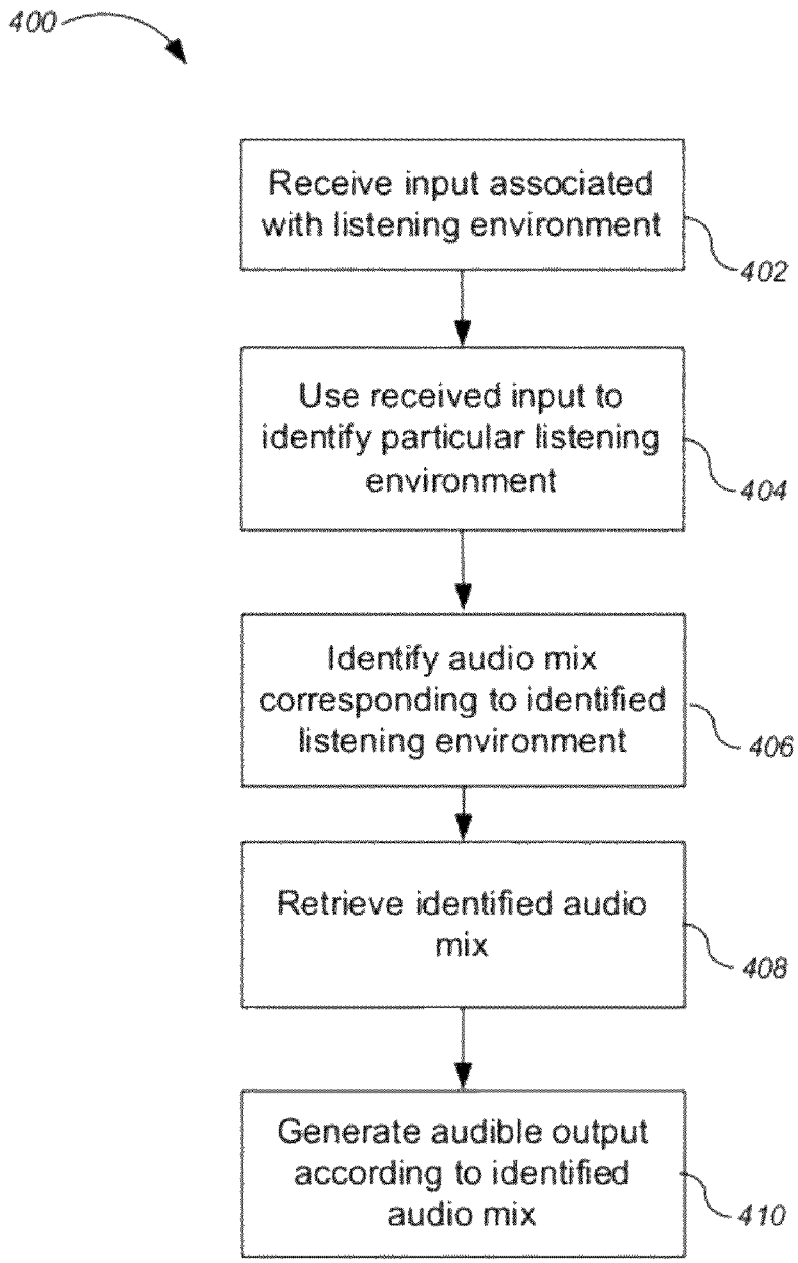
FIG. 4 is a flowchart of an example method for retrieving an audio mix.

FIG. 4 is a flowchart of an example method 400 for retrieving an audio mix associated with a particular listening environment. For convenience, the method 400 will be described with respect to a system that will perform the method 400.

The system receives 402 an input associated with a listening environment of a user. In some implementations, the system receives a user input identifying the particular listening environment from among multiple listening environments. For example, if the system provides the user with various environmental options, as shown in FIG. 2, the user can select the environmental option that best matches her listening environment.

In other implementations, the system can capture an ambient audio signal and analyze the ambient audio signal to determine the particular listening environment. For example, the ambient audio signal can be analyzed to identify a refrigerator hum or an airplane engine. The system can dynamically respond to changing events, e.g., an intermittent rainstorm changing the ambient noise in a home or a car.

In an alternative implementation, the input is a selection based on a device intended to play an audio mix. The audio mix can be one audio mix on a DVD including many audio mixes for various listening environments. The device can be a built-in DVD player for a minivan, and the DVD player can provide the input associated with the minivan. For example, the DVD player can select an audio mix from the DVD intended for an automotive setting or for an automotive setting with children. Similarly, the system can receive an input from an input device, e.g., a microphone connected to a computer or a receiver for a mobile device. The system can receive the input upon a user request or automatically.

The system uses 404 the received input to identify a particular listening environment from among multiple listening environments. For example, the system can identify a particular listening environment based on one or more received listening environment parameters. The system can use an input audio signal to identify particular audio parameters for the listening environment. The listening environment parameters can include an amplitude associated with the listening environment, particular frequencies associated with the listening environment, and a location associated with the listening environment.

In some implementations, the user selects a particular listening environment, e.g. an aircraft environment. Thus, the system identifies the particular listening environment according to the user selection. Alternatively, input received from an input device can specifically provide one or more listening environment parameters, e.g., a noise floor and headroom of the environment. Those received listening environment parameters can then be used to identify the listening environment.

The system identifies 406 an audio mix corresponding to the particular listening environment. The audio mix includes one or more parameters adjusted for the particular listening environment. For example, the system can change an amplitude of particular reference levels in the digital audio data in the audio mix based on the parameters for the particular listening environment. Similarly, the system can change portions of the frequencies of the audio mix to counteract interference (e.g., destructive interference) from the listening environment.

In some implementations, the system can perform further digital signal processing. For example, the system can use digital signal processing to provide smoothing to reduce aliasing. Alternatively, using a bandpass filter can remove unwanted distortions in lower and higher frequencies.

The system retrieves 408 the identified audio mix. For example, the system can transmit a request for the identified audio mix and receive the requested audio mix from a remote server. In some implementations, the system retrieves the audio mix from a DVD or a CD. For example, a DVD can include multiple audio mixes, each corresponding to a particular listening environment. The system can retrieve the particular audio mix (e.g., for playback) based on the identified listening environment. Likewise, the system can retrieve the audio mix in the player's device memory.

In some implementations, the system receives a collection of audio mixes for particular audio data where each audio mix corresponds to a distinct listening environment of the listening environments, where retrieving the identified audio mix includes selecting the identified audio mix from the collection of audio mixes. For example, the system can receive multiple audio mixes from a DVD, each audio mix corresponding to a particular listening environment.

The system generates 410 an audible output signal according to the identified audio mix. For example, the system can play an audio signal resulting form the identified mix through one or more speakers. The system can use a media player (e.g, as a component of the system or in communication with the system) to play the audio mix.

Figure 5:
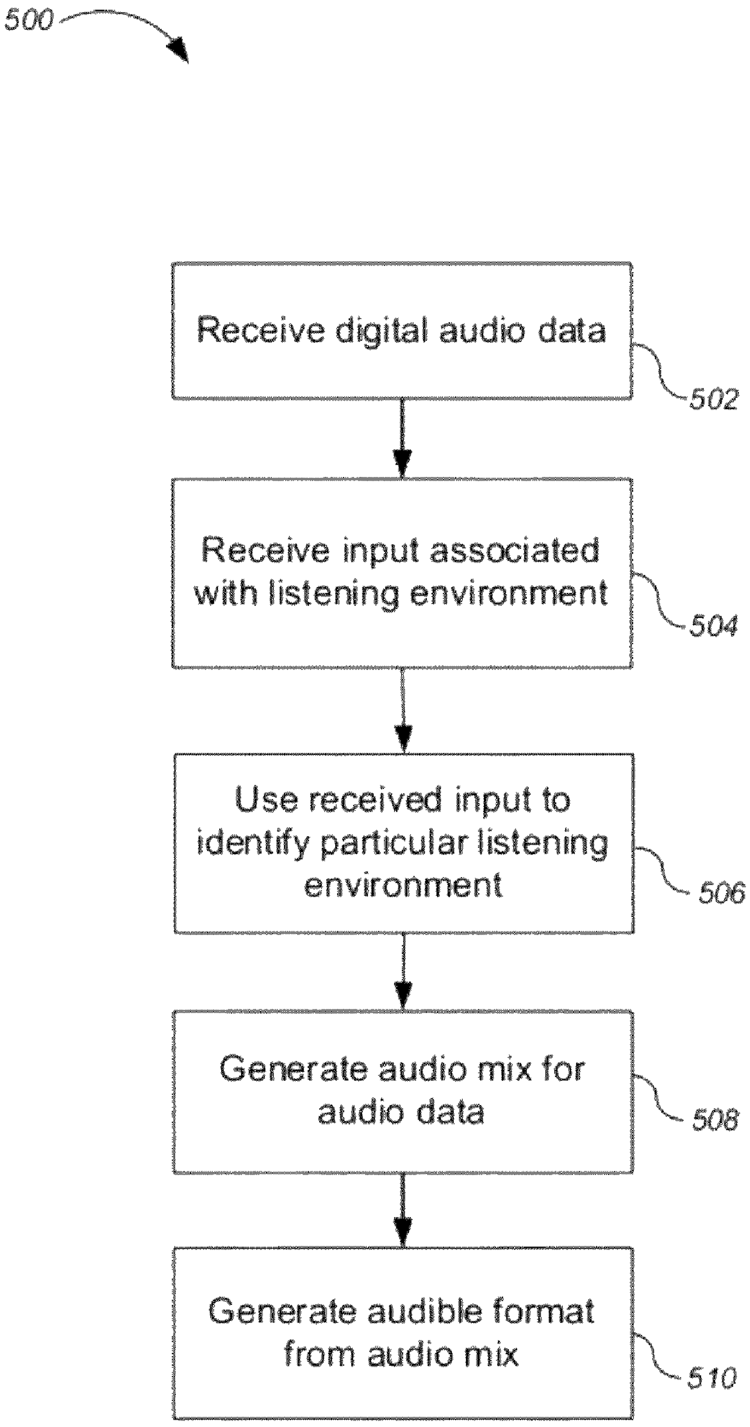
FIG. 5 is a flowchart of an example method for generating an audio mix for a particular listening environment.

FIG. 5 is a flowchart of an example method 500 for generating an audio mix for a particular listening environment. For convenience, the method 500 will be described with respect to a system that will perform the method 500.

The system receives 502 digital audio data. The digital audio data can be stored on a computer-readable storage medium, e.g., a DVD, a CD, a computer, or a mobile device. For example, the system can receive digital audio data from a remote server.

The system receives 504 an input associated with a listening environment. For example, the system can receive the input from a user, from an input device, or from a media player. In some instances, the user input specifies the listening environment in greater detail. For example, a current listening environment can be between two distinct environmental options. The user can select both to create a custom environmental option. For example, the user may live in a residential area near an airport. In such a situation, both a home environment and a plane environment can be considered the listening environment. Similarly, a user may sit near an active toddler on an aircraft. Selecting both a child environment and an aircraft environment, the user can create a custom environmental option.

The system uses 506 the received input to identify the particular listening environment. In some implementations, the system identifies the particular listening environment with no signal processing, because the input is a specific listening environment. For example, if the user selects a distinct input, e.g., the options available in FIG. 2, the system can interpret the input as specifying the distinct option. Alternatively, if the system receives the input as an audio signal from an input device, the audio signal can be processed using digital signal processing to identify the particular listening environment. For example, the system can determine the frequency and amplitude of an aircraft engine from an audio signal and identify the aircraft environment as the particular listening environment.

The system generates 508 an audio mix for the digital audio data. Generating an audio mix includes modifying one or more parameters of the audio data based on the particular listening environment. Modifying the one or more parameters includes modifying one or more reference levels to specified values for the listening environment. For example, if the particular listening environment has less headroom and a greater noise floor than in a listening environment that the digital audio data is intended to be heard, the system can modify the digital audio data based on those parameters. In some implementations, once the audio mix has been generated, the system performs digital signal processing to improve the quality of the audio mix.

The system generates 510 an audible output from the audio mix. For example, the system can play the audio mix, the audio track of a DVD, into an audible medium to be transmitted through a separate sound system. The sound system can include various audio equipment, e.g., speakers on a computer, headphones, a surround sound system in a home, or speakers in a car.

Figure 6:
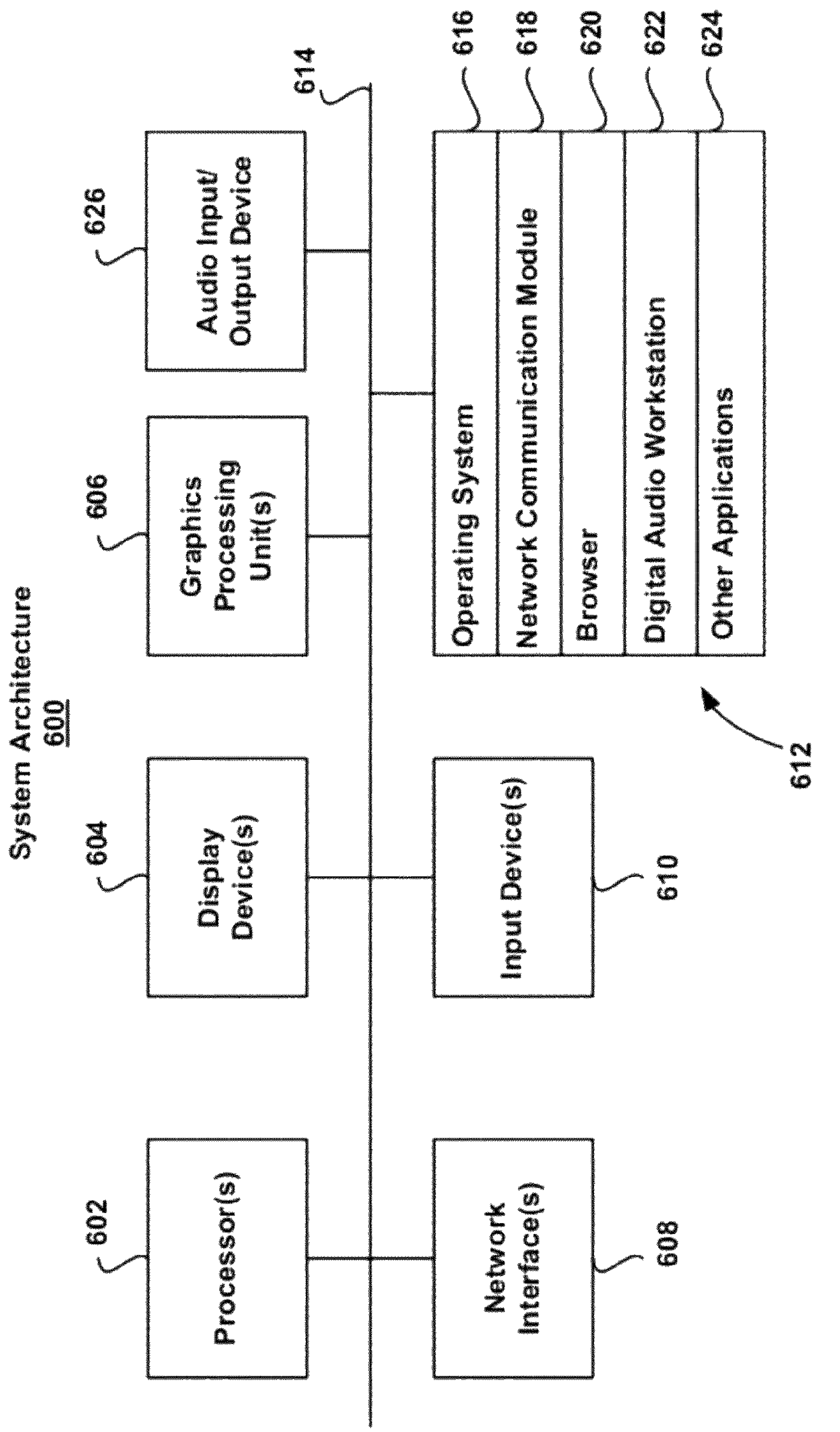
FIG. 6 is a block diagram of an exemplary user system architecture.

FIG. 6 is a block diagram of an exemplary user system architecture 600. The system architecture 600 is capable of hosting an audio processing application that can electronically receive, display, and edit one or more audio signals. The architecture 600 includes one or more processors 602 (e.g., IBM PowerPC, Intel Pentium 4, etc.), one or more display devices 604 (e.g., CRT, LCD), graphics processing units 606 (e.g., NVIDIA GeForce, etc.), a network interface 608 (e.g., Ethernet, FireWire, USB, etc.), input devices 610 (e.g., keyboard, mouse, etc.), and one or more computer-readable mediums 612. These components exchange communications and data via one or more buses 614 (e.g., EISA, PCI, PCI Express, etc.).

The term "computer-readable medium" refers to any medium that participates in providing instructions to a processor 602 for execution. The computer-readable medium 612 further includes an operating system 616 (e.g., Mac OS®, Windows®, Linux, etc.), a network communication module 618, a browser 620 (e.g., Safari®, Microsoft® Internet Explorer, Netscape®, etc.), a digital audio workstation 622, and other applications 624.

The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on computer-readable mediums 612 (e.g., memory or a storage device); controlling peripheral devices (e.g., disk drives, printers, etc.); and managing traffic on the one or more buses 614. The network communications module 618 includes various components for establishing and maintaining network connections (e.g., software for implementing communication protocols, such as TCP/IP, HTTP, Ethernet, etc.). The browser 620 enables the user to search a network (e.g., Internet) for information (e.g., digital media items).

The digital audio workstation 622 provides various software components for performing the various functions for generating an audio mix for a particular listening environment, as described with respect to FIGS. 2-5 including receiving digital audio data, receiving environmental inputs, calculating one or more audio parameters, and generating an audio mix. The digital audio workstation can receive inputs and provide outputs through an audio input/output device 626.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:

receiving digital audio data;

receiving an environmental input, the environmental input being associated with a listening environment;

calculating one or more audio parameters for the digital audio data based on the received environmental input, the calculating including:

calculating a particular intensity level for the digital audio data, and processing the digital audio data according to specified reference levels, the reference levels including a particular noise floor level and a preferred average level for the listening environment; and generating an audio mix for the digital audio data according to the one or more calculated audio parameters.

2. The method of claim 1, further comprising:

transmitting the audio mix.

3. The method of claim 1, further comprising:

storing the audio mix on a computer-readable storage medium.

4. The method of claim 1, where receiving the environmental input includes capturing ambient audio data using an input device.

5. The method of claim 1, where the environmental input provides sound quality of an output device for further signal processing of the digital audio data.

6. The method of claim 1, further comprising:

receiving a request from a user for the audio mix, the request comprising a matching environmental input, wherein the environmental input includes a user specified listening environment; and transmitting the audio mix.

7. The method of claim 1, further comprising:

generating an alternative audio mix based on an alternative environmental input.

8. A computer-implemented method comprising:

receiving digital audio data;

receiving an input associated with a listening environment;

using the received input to identify the listening environment;

generating an audio mix for the digital audio data, the generating including modifying one or more parameters of the audio data based on the listening environment and where modifying the one or more parameters includes modifying one or more reference levels to specified values for the listening environment, the reference levels including a particular noise floor level and a preferred average level for the listening environment; and generating an audible format from the audio mix.

9. A computer program product, encoded on a computer-readable medium, operable to cause data processing apparatus to perform operations comprising:

receiving digital audio data;

receiving an environmental input, the environmental input being associated with a listening environment;

calculating one or more audio parameters for the digital audio data based on the received environmental input, the calculating including:

calculating a particular intensity level for the digital audio data, and processing the digital audio data according to specified reference levels, the reference levels including a particular noise floor level and a preferred average level for the listening environment; and generating an audio mix for the digital audio data according to the one or more calculated audio parameters.

10. The computer program product of claim 9, further comprising:

transmitting the audio mix.

11. The computer program product of claim 9, further comprising:

storing the audio mix on a computer-readable storage medium.

12. The computer program product of claim 9, where receiving the environmental input includes capturing ambient audio data using an input device.

13. The computer program product of claim 9, where the environmental input provides sound quality of an output device for further signal processing of the digital audio data.

14. The computer program product of claim 9, further comprising:

receiving a request from a user for the audio mix, the request comprising a matching environmental input, wherein the environmental input includes a user specified listening environment; and transmitting the audio mix.

15. The computer program product of claim 9, further comprising:

generating an alternative audio mix based on an alternative environmental input.

16. A computer program product, encoded on a computer-readable medium, operable to cause data processing apparatus to perform operations comprising:

receiving digital audio data;

receiving an input associated with a listening environment;

using the received input to identify the listening environment;

generating an audio mix for the digital audio data, the generating including modifying one or more parameters of the audio data based on the listening environment and where modifying the one or more parameters includes modifying one or more reference levels to specified values for the listening environment, the reference levels including a particular noise floor level and a preferred average level for the listening environment; and generating an audible format from the audio mix.

17. A system comprising:

a processor and a memory operable to perform operations including:

receiving digital audio data;

receiving an environmental input, the environmental input being associated with a listening environment;

calculating one or more audio parameters for the digital audio data based on the received environmental input, the calculating including:

calculating a particular intensity level for the digital audio data, and processing the digital audio data according to specified reference levels, the reference levels including a particular noise floor level and a preferred average level for the listening environment; and generating an audio mix for the digital audio data according to the one or more calculated audio parameters.

18. The system of claim 17, further comprising:

transmitting the audio mix.

19. The system of claim 17, further comprising:

storing the audio mix on a computer-readable storage medium.

20. The system of claim 17, where receiving the environmental input includes capturing ambient audio data using an input device.

21. The system of claim 17, where the environmental input provides sound quality of an output device for further signal processing of the digital audio data.

22. The system of claim 17, further comprising:

receiving a request from a user for the audio mix, the request comprising a matching environmental input, wherein the environmental input includes a user specified listening environment; and transmitting the audio mix.

23. The system of claim 17, further comprising:

generating an alternative audio mix based on an alternative environmental input.

24. A system comprising:

a processor and a memory operable to perform operations including:

receiving digital audio data;

receiving an input associated with a listening environment;

using the received input to identify the listening environment;

generating an audio mix for the digital audio data, the generating including modifying one or more parameters of the audio data based on the listening environment and where modifying the one or more parameters includes modifying one or more reference levels to specified values for the listening environment, the reference levels including a particular noise floor level and a preferred average level for the listening environment; and generating an audible format from the audio mix.

* * * * *